June 21, 1949.  E. G. LIVESAY  2,474,153
FLAME CUTTING TORCH MACHINE
Filed Nov. 19, 1945  6 Sheets-Sheet 1
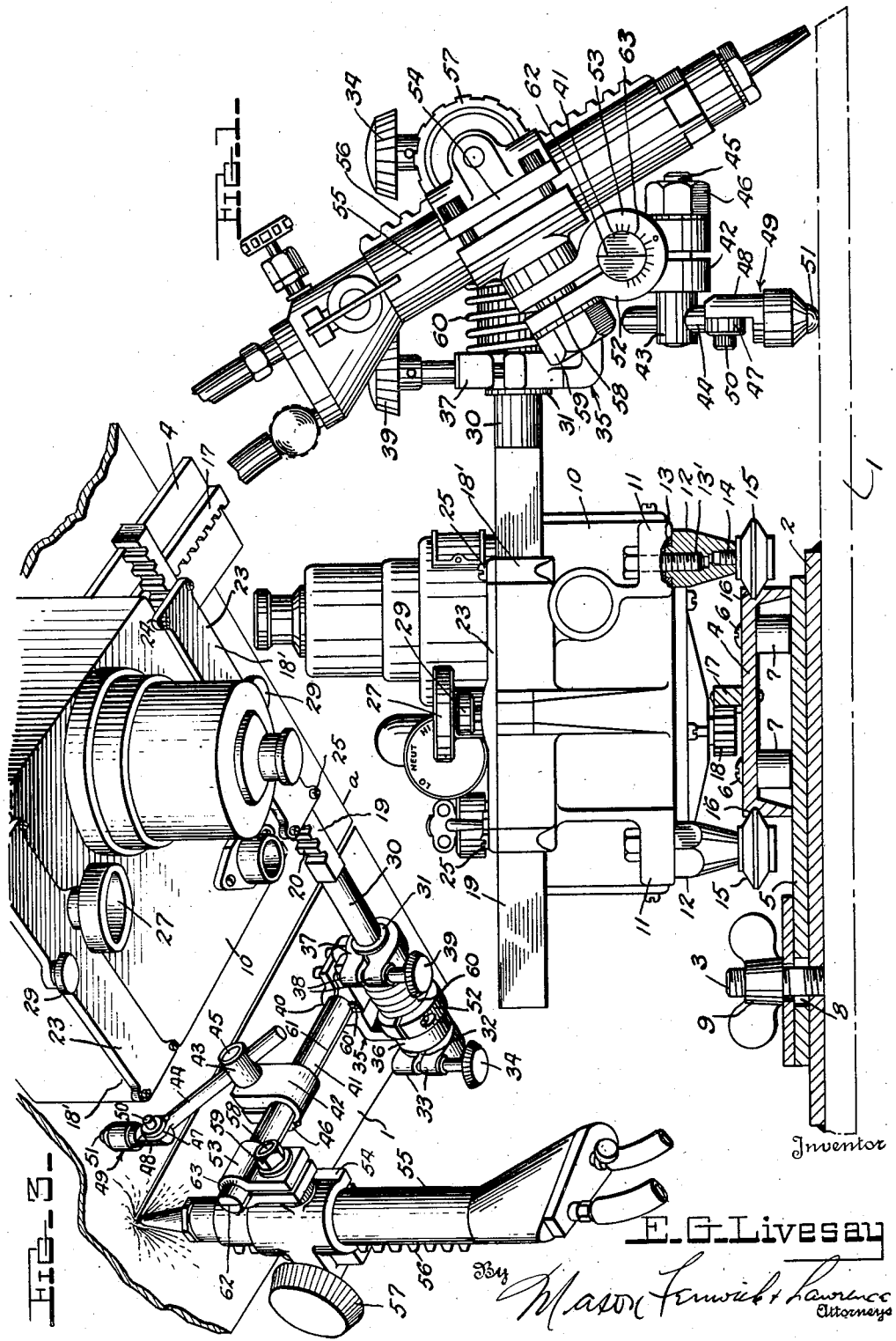
Inventor
E. G. Livesay
By Mason Fenwick & Lawrence
Attorneys

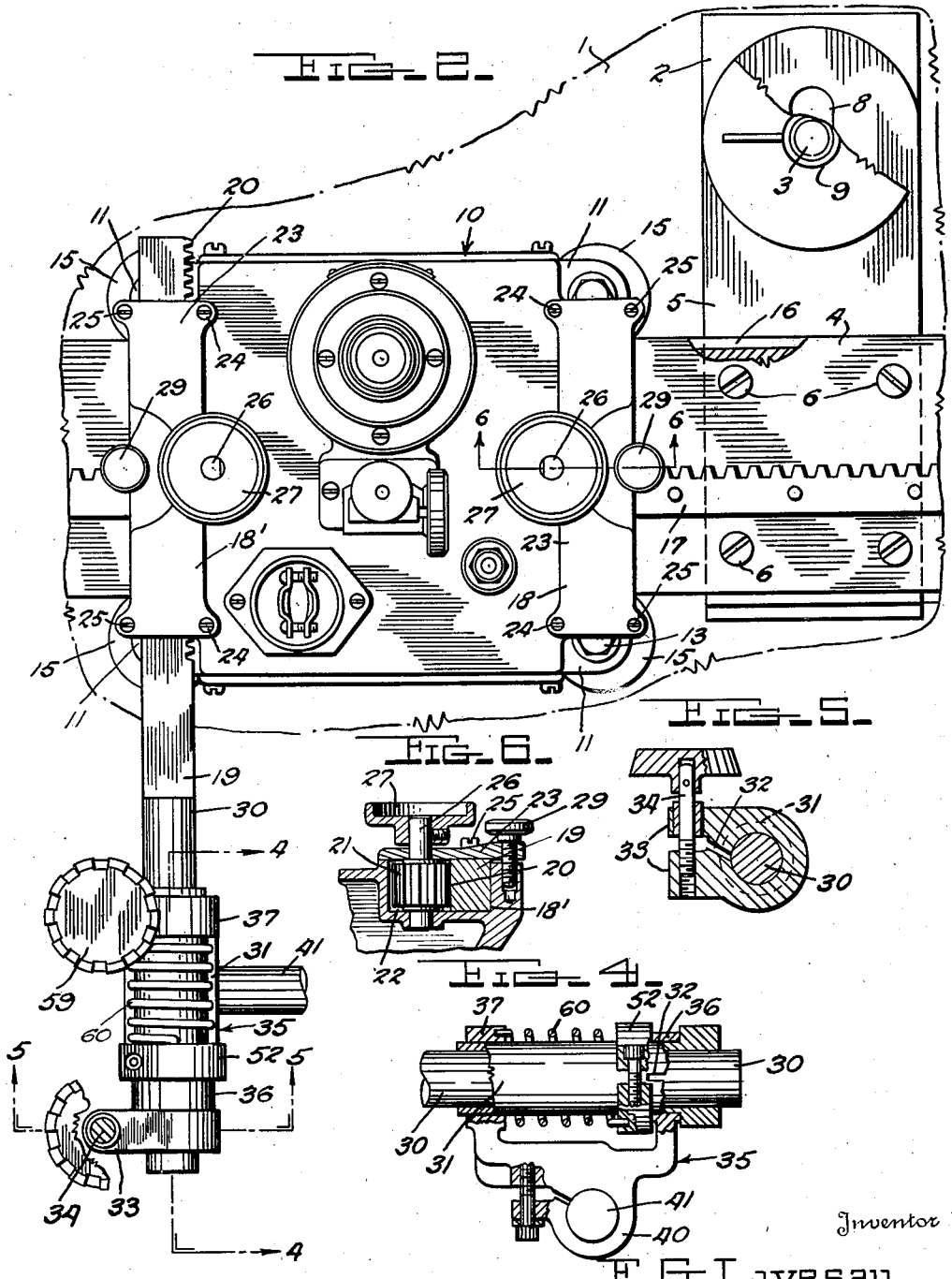

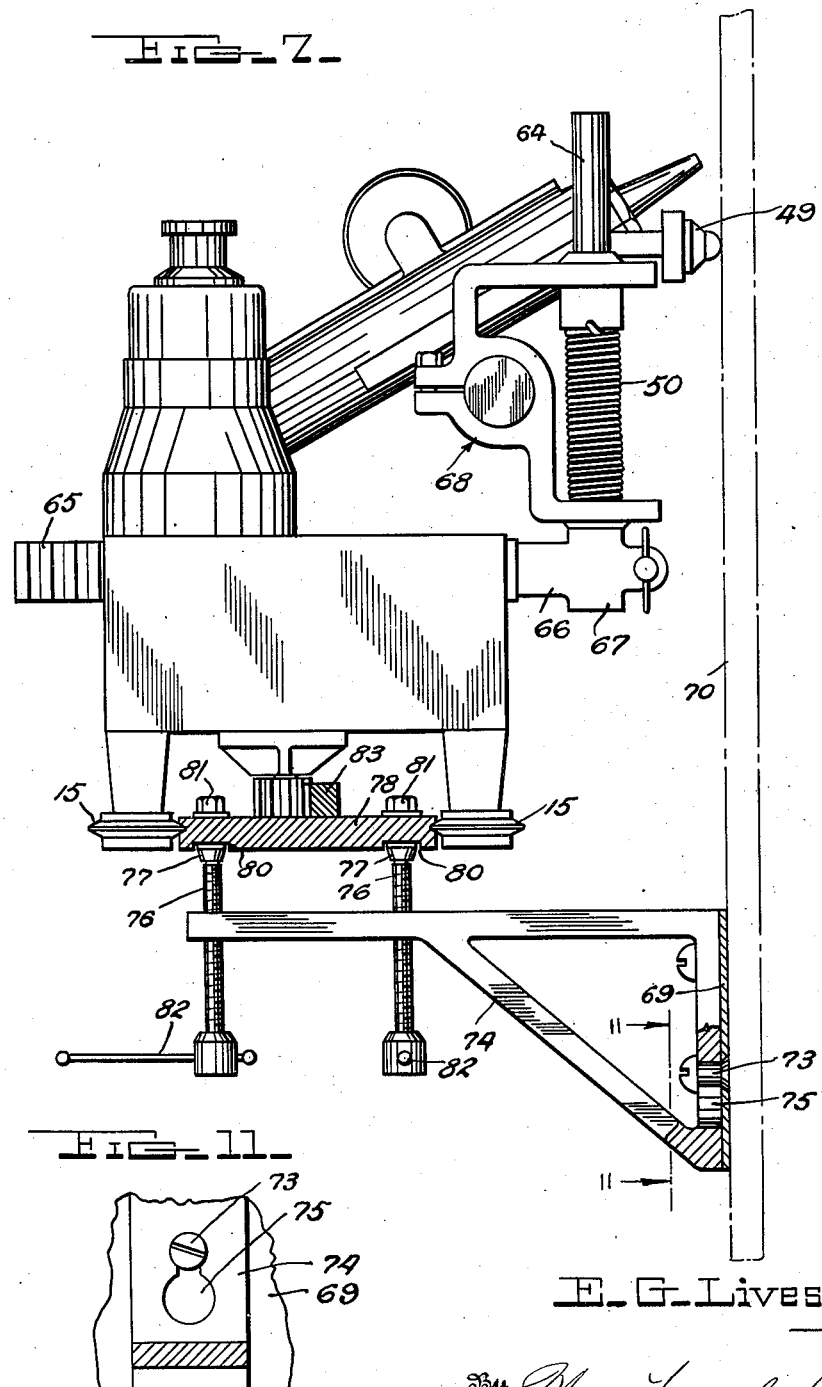

June 21, 1949. E. G. LIVESAY 2,474,153
FLAME CUTTING TORCH MACHINE
Filed Nov. 19, 1945 6 Sheets-Sheet 4
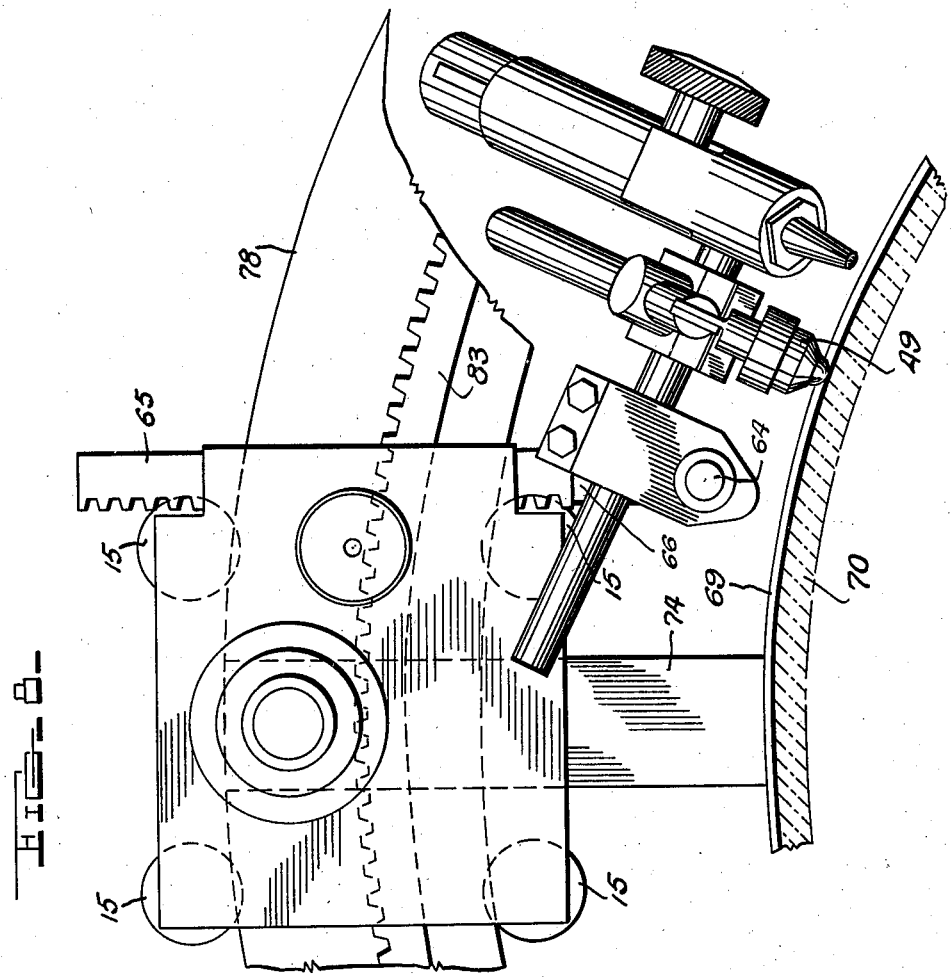
Inventor
E. G. Livesay

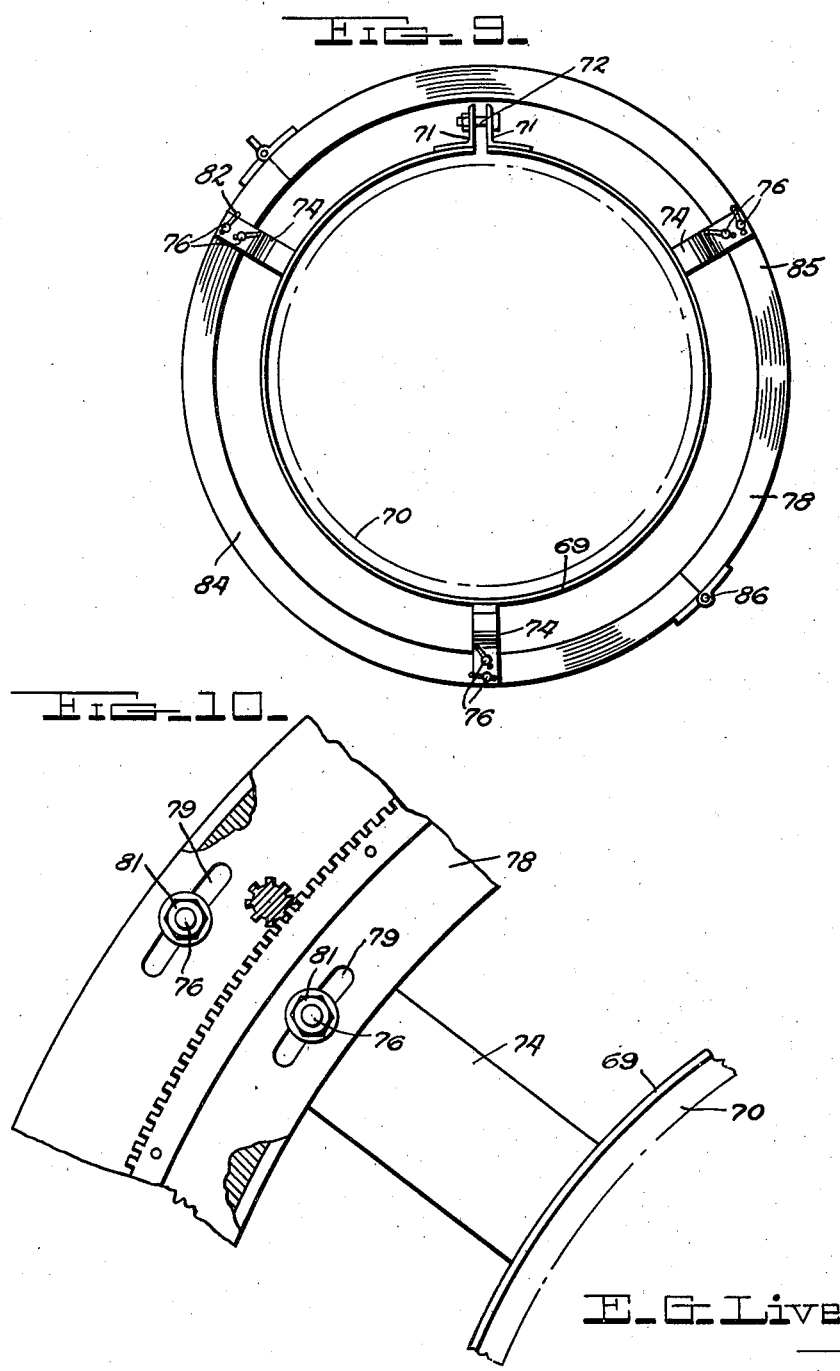

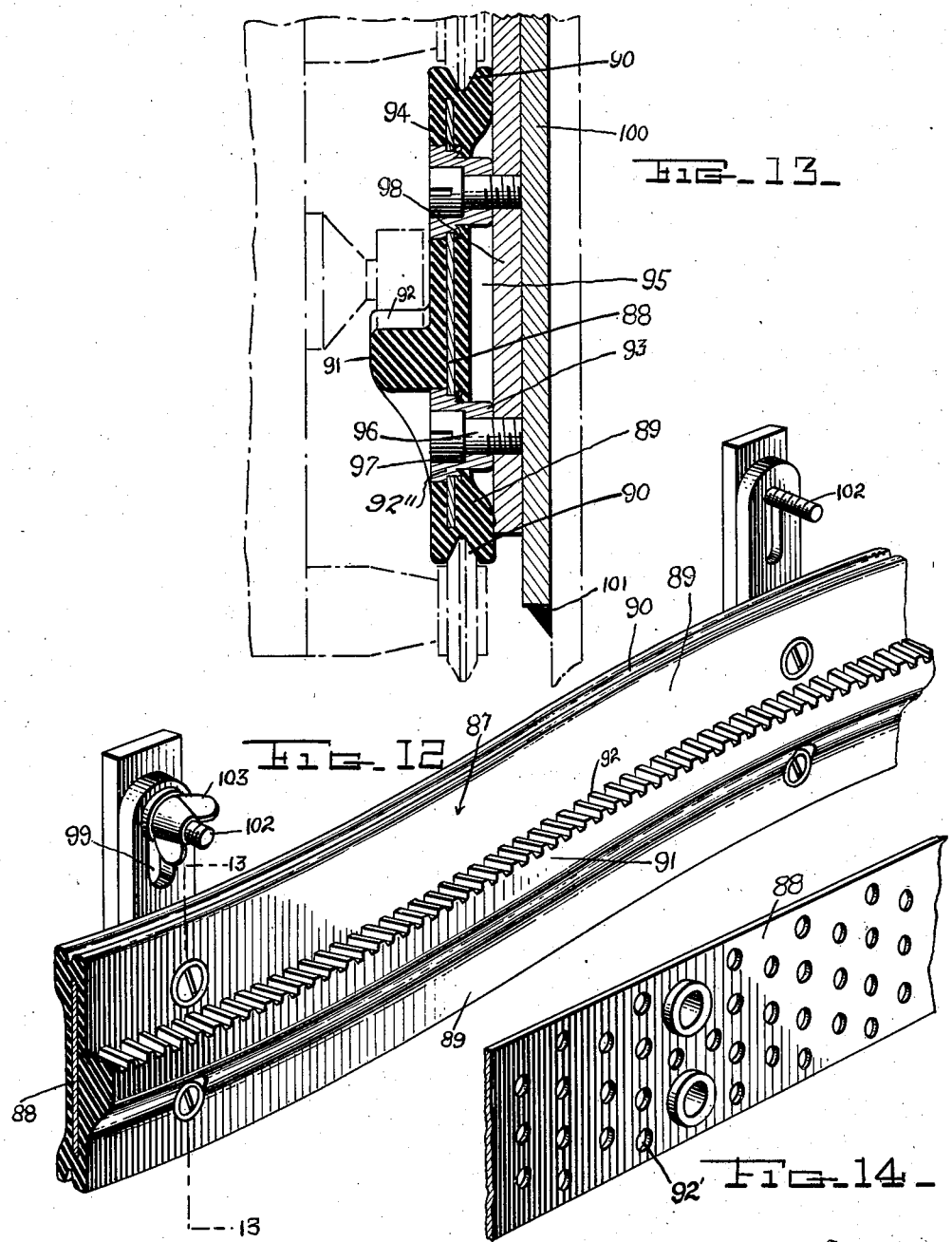

Patented June 21, 1949

2,474,153

UNITED STATES PATENT OFFICE 2,474,153

FLAME CUTTING TORCH MACHINE

Everett G. Livesay, New Orleans, La.

Application November 19, 1945, Serial No. 629,366

11 Claims. (Cl. 266—23)

1

This invention relates to flame cutting torch machines of the motor driven, track guided and track retained type.

The general object of the invention is to provide a torch machine of the type described which is universally adaptable to work in any position, such as downward, or on vertical or curved surfaces or in inverted position overhead.

Stated more specifically, an object of the invention is to provide a torch machine in which the traveling carriage carries a universally adjustable torch holder with associated torch rest for spacing the torch tip from the workpiece, having adjustable tensioning means for imparting the desired pressure of the torch rest against the workpiece, in any working position of the machine, and having means for immobilizing the tensioning means to hold the torch rest in the plane of the workpiece when the machine, including the torch rest, is moved off the workpiece preparatory to starting a cut at the edge thereof.

Another object of the invention is to provide a torch machine in which the carriage is provided with wheels at opposite sides on parallel axes in a common plane, adapted to run in lateral guiding and retaining grooves on a track, in which the axes of the wheels are individually rotatably adjustable to narrow or widen the wheel base of the carriage to take up lost motion between the track and carriage and also to adapt the carriage to travel on a curved track.

A further object of the invention is to provide a torch machine with adjustable wheels as described, in combination with a flexible track which can be employed either in straight or curved position.

Another object of the invention is to provide a torch machine and track assembly for making a circular cut in a cylindrical plate in a diametrical plane.

Still another object of the invention is the provision of a track of rubber or other nonmetallic substance, having the bending characteristics of rubber.

A further object of the invention is the provision of a self propelled flame cutting torch machine having a driven friction traction element coacting tractively with a friction strip on the track.

Other objects of the invention will appear as the following description of a preferred and practical embodiment thereof proceeds.

In the drawings which accompany and form a part of the following specification:

Figure 1 is a side elevation, partly in section,

2 of a flame cutting torch machine embodying the principles of the invention;

Figure 2 is a plan view, parts being broken away;

Figure 3 is a perspective view showing the machine working in overhead position, parts being broken away;

Figure 4 is a section taken along the line 4—4 of Figure 2;

Figure 5 is a section taken along the line 5—5 of Figure 2;

Figure 6 is a section taken along the line 6—6 of Figure 2;

Figure 7 is a vertical section through a track assembly adapted to embrace a cylindrical plate, the torch machine being shown in elevation;

Figure 8 is a top plan view of Figure 7;

Figure 9 is a bottom plan view of the track assembly;

Figure 10 is a fragmentary view, partly in section, of the track assembly view from above;

Figure 11 is a section taken along the line 11—11 of Figure 7;

Figure 12 is a perspective view showing a modified form of track;

Figure 13 is a cross-section taken along the line 13—13 of Figure 12, indicating also, in broken lines, the position of the torch machine;

Figure 14 is a fragmentary perspective view of the core plate of the track.

Referring now in detail to the several Figures, and first adverting to the machine shown in Figures 1 to 6, inclusive, the reference numeral 1 represents the plate to be cut. Positioning lugs 2 are tack welded to the plate in proper positions to support the track. Each positioning lug carries a threaded stud 3. The track 4 which may consist of sections placed end to end, is of inverted channel shape in cross-section, as shown in Figure 1. At intervals, the track rests upon adjusting lugs 5, which extend laterally from one side of the track and are secured thereto by means such as the screws 6 and spacers 7. The extended portions of the adjusting lugs have slots 8 which slip over the studs. Wing nuts 9 on the studs permit the track to be fixed in adjusted position. The lateral sides of the track have V-shaped grooves 16 and the top face of the track has a longitudinal toothed rack strip 17 intermediate its sides.

The torch machine includes a carriage 10, having the form of a closed casing, which houses a motor, change speed gearing, speed control means, a governor and other adjuncts with which the present invention is not concerned, and which therefore need not be specifically shown or described.

The lower part of the carriage 10 is provided at its corners with the extended ears 11. These are bored with bolt holes from the top and coaxially counterbored with recesses of larger diameter, from the bottom. A foot 12 engages the under face of each ear, having an axial circular boss 13, fitting rotatably in the recess. The feet 12 are provided with axial threaded bores from the top, and are secured to the ears 11 by stud bolts 13', screwed into said bores.

The feet are provided upward from their bottoms, with threaded bores axially parallel to the axes of rotation of the feet but offset therefrom. In these are screwed the wheel pins 14, on which the wheels 15 are journaled. The wheels are in a common plane and have V-shaped peripheries that match the V-shaped grooves in the sides of the track. For precise cutting it is essential that there be no lost motion between the carriage and track. By loosening the stud bolts 13', the feet may be turned to adjust the wheels to snugly embrace the track, and fixed in adjusting position by tightening the bolt studs. This adjustment is particularly useful when the carriage is to be operated upon a curved track.

Projecting from the under side of the carriage is the driven pinion 16, which meshes with the track rack strip 17.

The upper part of the carriage is formed, preferably at both ends, with guide channels 18', extending transversely of the direction of movement of the carriage and parallel to the common plane of the wheels 15. The guide channels are preferably of rectangular cross-section and are open at the top. A torch rack 19 fits slidably within one of said channels, and may be transferred to the other channel when it is desired to make a cut in the reverse direction or at the opposite side of the carriage. The torch rack is rectangular in shape throughout that part of its extent which slides within the channel, and is provided on one side with teeth 20. These mesh with an adjusting pinion 21 housed in a recess 22 at an intermediate point in a side wall of the channel. There is a similar pinion for both channels. The open tops of the channels are closed by cover plates 23, secured to the casing by screws 24 and 25. The pinions are fixed to shafts 26, journaled in the cover plates and in the underlying wall of the casing, and have knobs 27 on top, by which the pinions are turned to retract or extend the torch rack. It will be understood from Figure 6 that the screws 25 are sufficiently slack to permit the top rack to slide beneath the cover plate. The outer margin of each cover plate is formed with a bore receiving the shank of a clamp screw 29, which screws into a threaded socket in the outer side wall of the channel, by means of which the cover plate is clamped against the torch rack fixing it in adjusted position.

The outer end of the torch rack is cylindrical and acts as a bearing 30, for the torch assembly. The main purpose of the torch assembly is to support the torch with its tip spaced the proper distance from the workpiece, regardless of undulations in the track or inequalities in the surface of the workpiece, to prevent the torch from falling away from the workpiece when cutting in a vertical plane or overhead, to provide universality in the direction which the torch tip may assume, and for various adjustments for fixing the torch tip at any desired cutting angle.

The torch assembly comprises a sleeve 31, journaled on the bearing 30, longitudinally split at one end, as shown at 32 in Figures 4 and 5, and having clamping lugs 33 at opposite sides of the split, with a clamp screw 34 by which the sleeve 31 can be made fast to the torch rack. Normally, while the torch is operating, the sleeve 31 is fast to the torch rack. It is only released therefrom, upon occasion, to facilitate adjusting the tension of the torch assembly.

Journaled on the sleeve 31 is a yoke 35, having spaced bifurcations providing bearings 36 and 37, which surround said sleeve. One of the bearings, the bearing 37 in the illustrated example, is split and has clamp lugs 38 and a clamp screw 39 for making the yoke fast to the sleeve. A clamp collar 52 is fixed to the sleeve between the bifurcation of the yoke, close to the bearing 36 which holds the yoke against longitudinal displacement relative to the sleeve.

The body of the yoke is formed as a clamp 40, for adjustably holding the post 41. The latter extends in a plane perpendicular to the common plane of the wheels 15 and parallel to the direction of movement of the carriage. On the post is a torch rest holder 42, in the form of a split clamp which embraces the post and is adjustable both longitudinally and angularly relative thereto. This torch rest holder carries on one side a tubular socket member 43, rotatable on an axis in a plane perpendicular to the axis of the post. The socket member has lateral aligned holes coaxial at the diametrical plane of the socket member, in which holes the torch rest arm 44 is longitudinally slidable as well as rotatable. A bolt 45 passes through the clamp 42 and the socket member 43, having an eye (not shown), which surrounds the arm 44 within the socket member. By tightening the nut 46 on the end of this bolt, the torch rest holder 42 is clamped to the post in any adjusted position, the socket member 43 in any angular position about its axis, and the torch rest arm 44 in any position of longitudinal or rotary adjustment.

The forward end of the torch rest arm has an eye 47, offset to one side of the axial plane of said arm, forming a flat joint with a lug 47' forming part of the spacer foot 49, which lug is offset on the opposite side of said axial plane. A lateral stud carried by the lug 48, passes through the eye 47, and a nut 50 on the end of the stud permits the spacer foot to be fixed in any position of angular adjustment about the axis of the stud. The spacer foot carries a nonfriction ball 51 at its end, having its axis of contact in the plane of the flat joint.

The post 41 also carries a clamp 53 rotatably and longitudinally adjustable upon said post. This clamp carries a torch holder of usual construction, consisting of a longitudinal split clamp 54, shaped to receive, slidably but nonrotatably, a torch 55, having a toothed rack 56, extending along one side, engaged by a toothed pinion, (not shown), having the operating knob 57, by means of which the torch is racked in and out with respect to the torch holder. A bolt 58 passes through both clamps 53 and 54, said bolt lying axially in a diametrical plane of the post 41. The torch holder 54 is rotatable about this bolt as an axis. By tightening the nut 59 on the end of the bolt, the clamp 53 is fixed in any position of adjustment relative to the post, the torch holder in any position of angular adjustment, and the torch in any longitudinal position with respect to the torch holder.

The purpose of the torch arm rest 44 with spacer foot 49 is to support the torch assembly with the torch tip properly spaced from the workpiece. In order to obtain smooth performance of the torch, it is essential for the spacer foot to contact the workpiece with a certain optimum resilient pressure, which may vary according to the surface over which the spacer foot moves. This tension is supplied by means of a coil spring 60, which surrounds the sleeve 31 between the collar 52 and the remote bearing 37, being anchored at one end to the collar and at the other end to the yoke. The spring must be set to different tensions, according to different positions in which the machine is called upon to operate. For instance, when the machine is to travel vertically or in inverted position overhead, there is gravitational tendency for the torch assembly to fall away from the workpiece, and the spring must be set to such tension as to overcome gravity, and in addition, to apply the proper pressure to the spacer foot.

The torch assembly is set up and the spring 60 tensioned in the following manner. With the torch machine supported in any convenient position, the sleeve 31 carrying the yoke, is slipped on the torch rack bearing 30 and the clamp screw 34 tightened, making the sleeve and with it the collar 52 fast to said bearing. Then with the yoke clamp screw 39 loosened, the yoke 35 is turned on the sleeve in the winding direction of the spring 60, until the proper tension is obtained. (This is a factor derived from experience.) Then the yoke clamp screw 39 is tightened, holding the spring in tensioned position. Now, the machine is placed in position on the track, say, in the inverted position shown in Figure 3. The clamp screw is now loosened to free the sleeve from the bearing 30 and the torch assembly, including the sleeve, is swung until the spacer foot touches the workpiece. Then the clamp screw 34 is again tightened and the clamp screw 39 loosened, releasing the spring which transmits resilient pressure, at the desired tension, to the spacer foot, against the workpiece.

It will be obvious to those skilled in the art that in order to start the cut at the edge $a$ of the workpiece, it is necessary to have the track extend some distance off the edge $a$ and to start the machine off the edge $a$, so that the torch will be in motion when it crosses the edge $a$. If the machine were merely backed off the workpiece with the torch assembly under spring pressure, it is apparent that as soon as the torch and spacer foot go off the workpiece they would spring up above the plane of the workpiece so that upon returning in cutting direction the torch would collide with the edge of the workpiece.

This casualty is avoided in the present invention by the operator tightening the clamp screw 39 before backing the machine off the workpiece, so as to immobilize the spring and to fix the position of the yoke with the spacer foot in the plane of the workpiece. Then the machine is backed off, and when it moves toward the edge $a$ of the workpiece, the torch is properly spaced to begin the cut, and the spacer foot rides smoothly onto the workpiece. After the cut has been started, the operator loosens the clamp screw 39, and the spring takes control.

The torch rest arm 44 is normally so adjusted that the spacer foot is to the rear of the torch tip, so that the torch can cut to the remote edge of the workpiece while still sustained in proper spaced relation thereto by the spacer foot.

Through the provision of certain of the adjustments hereinbefore described, the torch may be directed to any forward or rearward angle in the plane in which the cut is to be made. It may also be adjusted to make bevel cuts of any angle. To facilitate the setting of the torch to make any precise angle of bevel, the yoke is provided with an index 60', indicating a line perpendicular to the common plane of the wheels 15, passing through the axis of the post 41. The post has a longitudinal line 61, meeting a diametrical line 62 on its forward end. The post is set up in the yoke with the line 61 meeting the index 60', so that the diametrical line 62 also is perpendicular to the common plane of the wheels 15. The clamp 53 of the torch holder has a circular scale 63 on its end adjacent the end of the post 41, which scale is read with reference to the diametrical line 62, to determine the setting of the torch holder for any particular bevel.

Referring now to that form of the invention shown in Figures 7 to 11, this is a special adaptation of the invention for making circular cuts in diametrical planes in cylindrical shells. A practical utilization is the cutting off the upper ends of driven circular piles. In this form of the invention the torch is supported upon an annular track which surrounds the cylindrical workpiece, and which lies in a plane perpendicular to the surface of the workpiece. In other words, the common plane of the wheels 15 is perpendicular to the surface to be cut, instead of parallel thereto, as in the form of invention previously described.

In order that the torch assembly shall be swingable toward and away from the workpiece, as in the first described form, it is necessary to provide a bearing extension 64 of the torch rack, extending at right angles thereto so that it lies parallel to the surface of the workpiece. This bearing extension is secured to the torch rack 65 by means of a fitting 66, secured to the end of the torch rack, and having a split clamp socket 67, receiving the end of the bearing extension 64. Except for the above modifications the torch machine is similar to that disclosed in connection with the first described form; consequently, for the sake of simplicity, the torch assembly 68 is more or less diagrammatically shown, a number of the adjustments being omitted. The track is composed of a flexible split band 69, adapted to surround the cylindrical workpiece 70, having lugs 71 secured thereto at the edges of the split, and drawn together by the nut 72 into clamping engagement with the workpiece 70. At angular intervals the band is provided with the headed studs 73. Brackets are provided, such as the bracket 74, shown in Figure 7, having a vertical web with keyhole slots 75 fitting over the studs, and having a horizontal arm with spaced threaded track leveling posts 76. These posts have swivel heads 77 for supporting the track 78, and threaded extensions from the swivel heads, passing through slots 79 in the track. The swivel heads 77 are preferably polygonal and fit into recesses 80 on the under side of the track so that they cannot turn when the nuts 81 are applied to the ends of the threaded extensions for securing the track. The swivel heads 77 are loosely peened over enlarged ends of the leveling posts. The leveling posts are operated by means of the sliding handles 82.

The track has grooves in its lateral edges receiving the wheels 15 of the torch machine, and a longitudinal rack bar 83 meshing with the motor driven pinion 18, on the under side of the torch machine.

Figure 9, which shows the under side of the track, indicates that it is made in circular sections 84 and 85 adjoined by the hinge bolts 86 to form a complete circle. The diameter of the circular track is larger than that of the workpiece which it surrounds, so that it rests upon the leveling post 76 in spaced relation to the vertical wall of the workpiece. In operation, the spacer foot 49 of the torch assembly presses the workpiece resiliently through the tension of the spring 60, and maintains the torch tip at proper cutting distance from the surface of the workpiece. The torch may be adjusted to cut straight across or at any angle of bevel. Since the torch machine travels clear around the workpiece, there is no problem involving immobilizing the spring 60, as is necessary when the torch starts off the workpiece and moves toward the leading edge.

Now, passing to the group of Figures 12 to 14, inclusive, these show a flexible track of composite metal and rubber-like material construction, adapted to follow curved contours, such as the lines of a ship. The track 87 comprises an elongated relatively wide, thin, resilient metal core strip 88, integrally embedded in a molded strip 89, of rubber or rubber-like material. The strip 89 is molded with the lateral grooves 90 on opposite sides to receive the guide wheels of the torch machine, and with a rib 91 on the top, having teeth 92 on one side, engageable by the traction gear of the torch machine.

The plate 88 is preferably studded with perforations 92', which increase its pliability, and through which the molded substance forms continuous keys. At longitudinally spaced intervals the plate is provided with tubular thimbles 92", passing through larger perforations in the plate, having shouldered heads 93, resting against one side of the plate, and thin skirts 94, which are upset against the opposite side of the plate, fixing the thimbles to the plate. The heads of the thimbles terminate flush with the upper face of the molded strip 89. The lower face of the strip 89 is preferably longitudinally recessed, as at 95, the lower ends of the thimbles projecting into the recess and terminating in the plane of the lower face of the strip.

The thimbles are bored for the passage of stud bolts 96, and counterbored at the top to receive the heads of said stud bolts which abut shoulders 97, formed between the bore and counterbore. The stud bolts preferably terminate flush with the upper ends of the thimbles and have kerfs by which they are turned. The stud bolts screw into adjusting lugs 98, to bring the lower ends of the thimbles in engagement with the adjusting lugs. Each adjusting lug extends beyond one side of the track, as shown in Figure 12, and has a longitudinal slot in the extended portion.

The adjusting lugs overlie positioning lugs 100, which are tack-welded to the workpiece, as indicated at 101. The positioning lugs carry threaded studs 102, which pass through the slots 99 and carry wing nuts 103, which can be tightened against the adjusting lugs. This construction permits the track to be adjusted relatively to the positioning lugs and workpiece.

As indicated in Figure 12, the track is bendable in the direction of its depth dimension, and capable of conforming to surfaces of curved or undulating contour. The closeness of spacing of the positioning and adjusting lugs depends upon the degree of curvature of the workpiece, said lugs being relatively closely spaced where the curvature is abrupt.

While I have in the above description disclosed what I believe to be preferred and practical features of the invention, it will be understood to those skilled in the art that the specific details of construction and arrangement of parts as described and illustrated, are by way of example and not to be construed as limiting the scope of the invention.

What I claim as my invention is:

1. Flame cutting torch machine comprising a carriage having wheels at opposite sides on parallel axes, in a common plane, adapted to engage lateral grooves on the opposite sides of a track, by which said machine is guided and retained, a torch rack extending transversely of said carriage in a plane parallel to the plane of the wheels, a post journaled on the end of said torch rack, a torch holder longitudinally and rotatably mounted on said post, a torch rest including an arm carried by said post at an angle thereto having an end adapted to contact the workpiece to space the tip of the torch therefrom, and a spring reacting between said torch rack and post for pressing said arm resiliently against the workpiece.

2. In a flame cutting torch machine of the track guided and retained, motor driven type, adapted to work in positions in which gravity acts in a direction to urge the torch away from the workpiece, a carriage, a torch rack extending from said carriage having a cylindrical bearing portion, a sleeve freely journaled on said bearing portion having a split end terminating in clamping lugs with means for drawing said lugs together to clamp said sleeve fast to said bearing portion, a yoke having spaced furcations journaled on said sleeve, one of said furcations being split and having clamping lugs with means for drawing said lugs together to clamp said post fast to said sleeve, a collar fast to said sleeve, between said furcations and adjacent one of them, preventing longitudinal displacement of said yoke, a coil spring about said sleeve between said collar and the other furcation, anchored at one end to said sleeve and at the other to said yoke, a post carried by said yoke, a torch holder longitudinally and rotatably adjustable on said post, a torch rest including an arm carried by said post at an angle thereto, having one end adapted to press the workpiece through the tension of said coil spring, to space the tip of the torch from the workpiece.

3. In a flame cutting torch machine of the track guided and retained, motor driven type, adapted to work in positions in which gravity acts in a direction to urge the torch away from the workpiece, a carriage, a torch rack extending from said carriage having a cylindrical bearing portion, a sleeve freely journaled on said bearing portion having a split end terminating in clamping lugs with means for drawing said lugs together to clamp said sleeve fast to said bearing portion, a yoke having spaced furcations journaled on said sleeve, one of said furcations being split and having clamping lugs with means for drawing said lugs together to clamp said post fast to said sleeve, a collar fast to said sleeve, between said furcations and adjacent one of them, preventing longitudinal displacement of said yoke, a coil spring about said sleeve between said collar and the other furcation, anchored at one end to said collar and at the other to said yoke, a post carried by said yoke, a torch holder longitudinally and rotatably adjustable on said post, a torch rest including an arm carried by said post at an angle thereto, having one end adapted to press the workpiece through the tension of said coil spring, to space the tip of the torch from the workpiece.

4. Flame cutting torch machine as claimed in claim 1, including a fitting on said post having a bore, said arm sliding in said bore and being longitudinally adjustable therein to adjust the distance of the torch tank from the workpiece.

5. Flame cutting torch machine as claimed in claim 1, said arm terminating in an angularly adjustable section carrying a non-friction workpiece engaging element.

6. Flame cutting torch machine as claimed in claim 1, said torch holder being rotatably adjustable in a plane parallel to the axis of said post.

7. Flame cutting torch machine as claimed in claim 1, including a fitting adjustable on said post having a bore, said arm sliding in said bore and being longitudinally adjustable therein to adjust the distance of the torch tip from the workpiece.

8. Flame cutting torch machine as claimed in claim 1, the workpiece engaging end of said arm being to the rear of the projection of the torch axis at its point of intersection with the workpiece, whereby said post is supported when the torch flame is off the end of the workpiece.

9. A flame cutting torch machine having a pair of separate sets of laterally interspaced supporting wheels disposed in track guided and retained relation respectively with a pair of cooperatively laterally interspaced and longitudinally extending track elements, a torch rack extending transversely of the machine, said rack extending laterally from a side of the machine, a post journalled on the end of the torch rack, a torch holder longitudinally and rotatably mounted on said post, a spacer element for said torch extending from said post and provided with a roller element at its free end, said roller element adapted to contact the work piece to space the tip of the torch therefrom and a spring reacting between said torch rack and said post for pressing said spacer element resiliently against the work piece.

10. The torch machine substantially as set forth in claim 9, wherein said torch holder is rotatably adjustable in a plane parallel to the axis of said post.

11. The torch machine substantially as set forth in claim 9, wherein said roller is disposed rearwardly of the projection of the torch axis at its point of intersection with the work piece, whereby said post is supported when the torch flame is off the end of the work piece.

EVERETT G. LIVESAY.

REFERENCES CITED

The following references are of record in the file of this patent:

UNITED STATES PATENTS

| Number | Name | Date |
| --- | --- | --- |
| 2,188,894 | Tyler | Jan. 30, 1940 |
| 2,334,301 | Young | Nov. 16, 1943 |
| 2,389,585 | Anderson | Nov. 27, 1945 |
| 2,403,514 | Franzen | July 9, 1946 |
| 2,412,147 | Hayes | Dec. 3, 1946 |
| 2,429,686 | Helmkamp | Oct. 28, 1947 |
| 2,433,734 | Bucko | Dec. 30, 1947 |